US012555169B2

(12) United States Patent
Gomes et al.

(10) Patent No.: US 12,555,169 B2
(45) Date of Patent: Feb. 17, 2026

(54) CREDIT ELIGIBILITY PREDICTOR (71) Applicant: ADP, Inc., Roseland, NJ (US)

(72) Inventors: Guilherme Gomes, Porto Alegre (BR);
Roberto Silveira, Sao Paulo (BR);
Stefan Zanona, Porto Alegre (BR);
Wagner Peres, Porto Alegre (BR);
Leonardo Santos, Porto Alegre (BR);
Mallie Griffin, Florence, SC (US);
Anjo Costa, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 205 days.

(21) Appl. No.: 18/346,751

(22) Filed: Jul. 3, 2023

(65) Prior Publication Data
US 2023/0394592 A1    Dec. 7, 2023

Related U.S. Application Data

(63) Continuation of application No. 16/383,984, filed on Apr. 15, 2019, now Pat. No. 11,694,277.

(51) Int. Cl.
*G06Q 30/00*        (2023.01)
*G06N 3/08*         (2023.01)
*G06Q 10/105*       (2023.01)
*G06Q 40/12*        (2023.01)

(52) U.S. Cl.
CPC ............ *G06Q 40/123* (2013.12); *G06N 3/08* (2013.01); *G06Q 10/105* (2013.01)

(58) Field of Classification Search
CPC ...... G06Q 40/123; G06Q 10/105; G06N 3/08; G06N 3/048; G06N 3/084; G06N 3/105; G06N 3/126; G06N 5/01
See application file for complete search history.

(56) References Cited

U.S. PATENT DOCUMENTS

| | | | |
|---|---|---|---|
| 7,580,848 B2* | 8/2009 | Eder | G06Q 10/06 705/7.11 |
| 2002/0042786 A1* | 4/2002 | Scarborough | G09B 7/02 706/21 |
| 2013/0007099 A1* | 1/2013 | Lee | G06Q 30/0279 709/203 |

OTHER PUBLICATIONS

US Notice of Allowance issued in corresponding U.S. Appl. No. 16/383,984, dated Dec. 14, 2022 (9 pages).

(Continued)

*Primary Examiner* — Rokib Masud
(74) *Attorney, Agent, or Firm* — Foley & Lardner LLP (57) ABSTRACT

Aspects extract, from payroll data of employees of an organization, data historically associated to previous instances of certified tax credit eligibility; normalize the extracted data with respect to data type and data value; generate from the normalized extracted data via a neural network classifier multi-class outputs for each employee that indicate strengths of likelihood that each employee is currently eligible for each of a plurality of different tax credits; filter the normalized extracted data by removing portions associated to employees indicated within the multi-class outputs as having no currently eligible likelihood for the different tax credits, thereby generating a remainder set of normalized extracted data associated to remainder eligible ones of the employees; and prioritize application for the tax credits for the remainder eligible employees as a function of respective values and likelihoods of eligibility within the remainder set of normalized extracted data.

20 Claims, 2 Drawing Sheets

(56) References Cited

OTHER PUBLICATIONS

US Office Action issued in corresponding U.S. Appl. No. 16/383,984, dated May 27, 2021 (15 pages).
US Office Action issued in corresponding U.S. Appl. No. 16/383,984, dated Sep. 8, 2022 (14 pages).

* cited by examiner

CREDIT ELIGIBILITY PREDICTOR

RELATED APPLICATIONS

This application is a continuation of and claims priority under 35 U.S.C. § 120 to U.S. patent application Ser. No. 16/383,984, entitled "CREDIT ELIGIBILITY PREDICTOR", which was filed on Apr. 15, 2019 and issues as U.S. Pat. No. 11,694,277 on Jul. 4, 2023, and is incorporated herein by reference in its entirety.

BACKGROUND

The field of Human Capital Management (HCM) includes payroll tax notice processing from various taxing agencies concerning payroll taxes owed by a taxed entity, such as a company or organization.

Human resource management (sometimes "HRM" or "HR") generally refers to functions and systems deployed in organizations that are designed to facilitate or improve employee, member or participant performance in service of an organization or employer's strategic objectives. HR comprehends how people are identified, categorized and managed within organizations via a variety of policies and systems. Human Resource management systems may span different organization departments and units with distinguished activity responsibilities: examples include employee retention, recruitment, training and development, performance appraisal, managing pay and benefits, and observing and defining regulations arising from collective bargaining and governmental laws. Human Resource Information Systems (HRIS) comprehend information technology (IT) systems and processes configured and utilized in the service of HR, and HR data processing systems which integrate and manage information from a variety of different applications and databases.

SUMMARY

In one aspect of the present invention, a method includes a processor extracting, from payroll data of each of a plurality of employees of an organization, data that is historically associated to previous instances of certified tax credit eligibility; normalizing the extracted data with respect to data type and data value; generating, via a neural network classifier, from an input of the normalized extracted data, multi-class outputs for each employee that indicate strengths of likelihood that each employee is currently eligible for each of a plurality of different tax credits, wherein the neural network classifier is trained on normalized data values and historic success rates for each of a plurality of persons that applied for the tax credits; filtering the normalized extracted data by removing portions of the normalized extracted data that are associated to ones of the employees that are indicated within the multi-class outputs as having no likelihood that they are currently eligible for any of the plurality of different tax credits, thereby generating a remainder set of normalized extracted data that is associated to remainder eligible ones of the employees; and prioritizing an order of application for each of the tax credits for the remainder eligible ones of the employees as a function of respective values and likelihoods of eligibility of the tax credits indicated within the remainder set of normalized extracted data.

In another aspect, a system has a hardware processor in circuit communication with a computer readable memory and a computer-readable storage medium having program instructions stored thereon. The processor executes the program instructions stored on the computer-readable storage medium via the computer readable memory and thereby extracts, from payroll data of each of a plurality of employees of an organization, data that is historically associated to previous instances of certified tax credit eligibility; normalizes the extracted data with respect to data type and data value; generates, via a neural network classifier, from an input of the normalized extracted data, multi-class outputs for each employee that indicate strengths of likelihood that each employee is currently eligible for each of a plurality of different tax credits, wherein the neural network classifier is trained on normalized data values and historic success rates for each of a plurality of persons that applied for the tax credits; filters the normalized extracted data by removing portions of the normalized extracted data that are associated to ones of the employees that are indicated within the multi-class outputs as having no likelihood that they are currently eligible for any of the plurality of different tax credits, thereby generating a remainder set of normalized extracted data that is associated to remainder eligible ones of the employees; and prioritizes an order of application for each of the tax credits for the remainder eligible ones of the employees as a function of respective values and likelihoods of eligibility of the tax credits indicated within the remainder set of normalized extracted data.

In another aspect, a computer program product has a computer-readable storage medium with computer readable program code embodied therewith. The computer readable program code includes instructions for execution which cause the processor to extract, from payroll data of each of a plurality of employees of an organization, data that is historically associated to previous instances of certified tax credit eligibility; normalize the extracted data with respect to data type and data value; generate, via a neural network classifier, from an input of the normalized extracted data, multi-class outputs for each employee that indicate strengths of likelihood that each employee is currently eligible for each of a plurality of different tax credits, wherein the neural network classifier is trained on normalized data values and historic success rates for each of a plurality of persons that applied for the tax credits; filter the normalized extracted data by removing portions of the normalized extracted data that are associated to ones of the employees that are indicated within the multi-class outputs as having no likelihood that they are currently eligible for any of the plurality of different tax credits, thereby generating a remainder set of normalized extracted data that is associated to remainder eligible ones of the employees; and prioritize an order of application for each of the tax credits for the remainder eligible ones of the employees as a function of respective values and likelihoods of eligibility of the tax credits indicated within the remainder set of normalized extracted data.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

Figure 1:
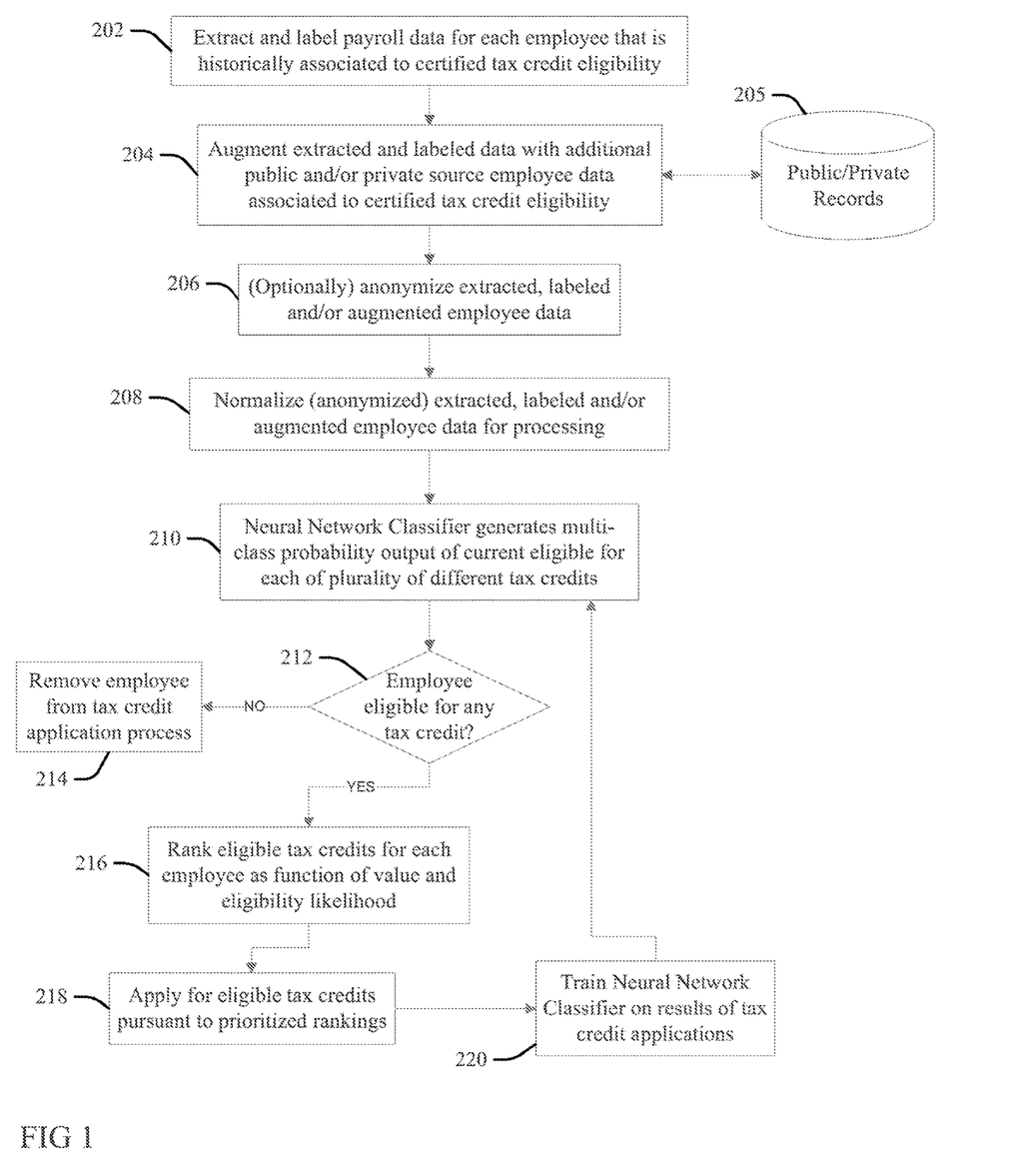
FIG. 1 is a flow chart illustration of a method or process aspect according to the present invention.

FIG. 1 illustrates a method or process embodiment of the present invention. At 202 a processor configured according to the present invention (the "configured processor") extracts from payroll data of each of a plurality of employees of an organization (company, partnership, governmental department, non-governmental organization, etc.) data that is historically required for or otherwise associated to previous instances of certified tax credit eligibility, and labels or otherwise identifies the extracted data type or value. Thus, at 202 the configured processor associates or otherwise joins extracted payroll data with historical screening information that is used to label the data in a supervised method, in some aspects generating structured data of a type appropriate to the labeled data. In one example, the configured processor at 202 transforms extracted string data that is identified as an employee date-of-hire (for example, via determining that it follows the text string "Date of hire:", or that it is retrieved from an object data field that is labeled as "Date of hire") into numeric data of a specified format (for example, "MM/DD/YY", signifying two integers selected form the range of 01 through 12 for the month ("MM"), separated by a forward slash ("/") from two integers selected form the range of 01 through 31 the day of the month ("DD"), separated by a forward slash ("/") from two integers selected form the range of 00 through 99 for the last two digits of the year of hire ("YY")).

Illustrative but not exhaustive examples of the data extracted and labeled at 202 include employee name, date of hire, domicile and/or business unit address, current and prior employment job titles, job duties, industry types, wage and salary information, military service status or history, disability status or benefits awarded, gender, age, unique taxpayer identification number (inclusive of social security number, individual number, etc.) and still other relevant data will be apparent to one skilled in the art.

At 204 the configured processor augments the data extracted and labeled at 202 with additional data associated to certified tax credit eligibility that is identified via analysis of public and/or private records 205. Illustrative but not exhaustive examples of the public and/or private records 205 include social and professional networking media (for example, Facebook®, Instagram®, LinkedIn®, etc.), newsfeeds, governmental records, credit report agency records, insurance company records, and still other external public and/or private sources will be apparent to one skilled in the art. (FACEBOOK and INSTAGRAM are trademarks of Facebook, Inc. in the United States or other countries; LINKEDIN is a trademark of LinkedIn Corp. in the United States or other countries.)

For example, image analysis at 204 of an image of an employee posted in social media may recognize (via comparison to labelled images, or fitting image data masques, etc.) that the employee is wearing military attire, which when considered in view of nationality and/or residence data for the employee, text content associated with the image processed via Natural Language Processing (NLP) techniques ("Here is Susan at Fort Necessity"), and/or metadata (for example, a tag of "Susan" applied to a person in uniform within an image that is geo-tagged as acquired within the location of "Fort Necessity") results in a determination that the employee is or was in active military service, adding associated structured data values to the data extracted for the employee at 202 as additional information.

Via image and text content analysis the configured processor at 204 may add a variety of data values that are historically associated to previous instances of certified tax credit eligibility, including indicators that an employee is possibly or likely disabled (as determined from identifying wheelchairs or other equipment used by or associated to the employee within image or text content data). For data not directly provided by the employee (for example, in response to a questionnaire) and extracted at 202, the configured processor may search public and/or private records 205 to identify records associated to the employee name or taxpayer identification, etc., for data indicative of periods of time and values of benefits received for unemployment compensation, disability, job training, vocational or physical rehabilitation services, welfare, food stamps or public housing assistance, and still other relevant, associated data will be apparent to one skilled in the art. Such augmented data values added by the configured processor at 204 define extra features that enrich the original dataset defined by the extraction and labeling process at 202, and thereby improve the outputs of the processes described below.

At 206 the configured processor optionally "anonymizes" the data extracted, labeled and augmented for each of the employees. Thus, the configured processor obscures, encrypts excludes or removes confidential and sensitive information such as name, taxpayer identification, gender, domicile address and other data, sometimes referred to as PII ("Personally Identifiable Information"), in order protect from inadvertent disclosure of employee confidential and sensitive information in subsequent processing, wherein employee identities may remain anonymous in subsequent processes described below.

At 208 the configured processor normalizes the (anonymized) extracted, labeled and/or augmented employee data for processing. More particularly, the processed data values may vary as to values and format depending on how different organizations define or specify the data, including job title descriptions and technical field categorizations, how wages are defined or processed by payroll (on a work-piece or flat fee basis, or on an hourly, weekly, monthly or yearly salary basis, etc.). Normalization at 208 may thus transform a data element (salary, date of hire, etc.) that varies by data values, type or format across different employees, or organizations or departments, into a uniform, structured data of a specified or common value, data type or format. Processes or systems applied at 208 include a include a Job Title Classifier that outputs a single, common job classification code "SOC (15-1133.00—Software Developers" for inputs of each of plurality of different employee job titles or defined duties, skills or functions of the employees, including text string content derivative descriptions of "Hadoop engineer" and "Machine learning engineer," etc., thereby resolving different input values to a same, common job title code. An "Employee-type Clusterer" identifies type values for an employee by finding commonalities across job title, duties, task, etc.: for example, a plurality of employees may be labeled (or assigned) an "Accounts receivable Services" type in response to determining that they each have duties that include the receipt and approval of payments from vendors or consumers. Still other examples will be apparent to one skilled in the art.

At 210 the configured processor provides or defines a Neural Network Classifier, a supervised classifier model, that is trained on normalized data values and success rates in qualifying for each of a plurality of persons that applied for the tax credits. Thus, in response to input of the normalized (anonymized) extracted, labeled and/or augmented employee data at 210 the configured processor generates a multi-class output for each employee that indicates strength of likelihood or probability that each employee is currently eligible for each of a plurality of different tax credits as a function of their respective normalized (anonymized) extracted, labeled and/or augmented employee data values.

At 212 the configured processor determines for each of the employees whether the employee is (likely) eligible for a tax credit. If not ("NO"), then at 214 the configured processor removes the employee from consideration for application for a tax credit by a tax credit application department, systems or processes of the employee's organization. Thus, via the processes at 212 and 214 the configured processor filters the employee data, reducing the amount of data that must be processed in the tax credit application, thereby improving efficiencies in processing costs and time, wherein time to apply for a given tax credit may be limited.

In response to determining at 212 that an employee is (likely) eligible for at least one tax credit ("YES"), at 216 the configured processor ranks the likely eligible tax credits for each employee as a function of their value and likelihood of eligibility, and at 218 applies for each of the eligible tax credits in order of or otherwise pursuant to their prioritized rankings.

In a feedback process at 220 the configured processor uses validated data classified for tax credit and performs re-training of the Neural Network Classifier on the results of tax credit applications executed at 218, wherein the Neural Network Classifier thereby further learns associations of data obtained from the application successes and failures to available tax credits.

In one example, the Neural Network Classifier is a multi-layer perceptron (MLP) that is trained in a supervised fashion (Illustrative but not limiting or exhaustive examples of training methods include "Backpropagation", "Genetic Algorithms", "Lagrange Multiplier Updates" or "Bayesian Optimization") using neural network frameworks. Illustrative but not limiting or exhaustive examples of such frameworks include "Keras/Tensorflow", PyTorch, Sklearn, Chainer and Apache MXNet. A multi-layer perceptron is a class of feed-forward artificial neural network that can distinguish data that is not linearly separable and generally comprises at least three layers of nodes (an input layer, a hidden layer and an output layer), wherein (except for the input nodes) each layer may use a nonlinear activation function. Illustrative but not limiting or exhaustive examples of activation functions include "Hyperbolic Tangent", "Sigmoid" and "ReLU"). "Keras", "PyTorch", "Chainer" and "Apache MXNet" are open source neural network libraries written in Python. "TensorFlow" is an open-source software library for dataflow programming across a range of tasks comprising a symbolic math library used for neural networks and other machine learning applications. "Sklearn" is a free software machine learning library for the Python programming language featuring various classification, regression and clustering algorithms.

In order to avoid overfit due to large amount of data available, some embodiments of the Neural Network Classifier use regularization techniques. Illustrative but not limiting or exhaustive examples include modifications such as "L2 regularization" or "weight decay" process that gives preference to a particular solution with smaller norms or other desirable properties; and "dropout," a process for reducing overfitting in neural networks by preventing complex co-adaptations on training data.

Conventional HR tax credit certification processes and systems are generally unable to timely identify and utilize all available tax credits that accrue through each of their employees, contractors or business entities. To identify available tax credits under conventional systems organizations must review tax credit programs for specific data requirements, and then timely acquire and assess the identified information for each employee in order to determine whether the employee meets the requirements. Some information values are only identified in response to other inputs from the employee: for example, in response to determining that an employee is a veteran, the HR system may need to return to that employee and make an additional inquiry as to specific dates of service, rank and type of discharge, etc., and the additional time associated with follow-up inquiries may exceed application deadlines, resulting in loss of the opportunity for acquiring an associated tax credit. Thus, organizations fail to identify potential credit revenues when conventional HR mechanisms fail to timely identify eligible employees, including before the time periods for application for the credit lapses. Conventional HR tax credit certification processes are also generally costly and time consuming and may waste time and expenses running certification processes for employees with low eligibility probability while deadlines lapse for pursuing certification of other employees with higher eligibility probability.

Conventional HR tax credit screening and certification processes are generally costly in proportion to the number of their employees, resulting in larger costs for larger organizations, and wherein such larger costs may bear no relation to the amounts of eligible tax credits identified by the conventional HR tax credit certification processes. More particularly, scaling-up a conventional HR tax credit certification process to meet increased numbers of employees may not result in a corresponding increase in identification and acquisition of eligible tax credits, in part due to missed opportunities for credits available for some employees that expire before discovery while resources are spent in processing other employees. Thus, it is more likely for delays inherent in conventional HR screening processes to result in the loss of expiring tax credits for larger organizations relative to smaller organizations (wherein a smaller number of employees is more likely to be completely assessed and processed for tax credit eligibility before the lapse of applicable deadlines), in spite of the proportionately higher cost expenditures required for the larger employee pool.

In contrast, aspects of the present invention provide advantages over conventional processes. Neural network processes learn associations of employee data that might seem disparate or otherwise unrelated to other values present within successful applications for tax credits in a rapid fashion, enabling the autonomous identification of tax credit opportunities that would otherwise lapse through the longer time lines required by conventional processes to actively identify required input data in response to the presence of other input data (as described in the above example, in response to determining that an employee was formerly a member of a military service, the conventional process must execute additional data queries to establish times of service and compare the times to requisite deadlines, etc.) By generating a multi-class output (at 210, FIG. 1) for each employee that indicates strength of likelihood or probability that each employee is currently eligible for each of a plurality of different tax credits, aspects may rapidly and autonomously prioritize or triage available credit opportunities, to focus on the ones that provide the greatest return in value, or highest likelihood of successful application, before limited time periods lapse, or the employee becomes unavailable to provide necessary additional information, etc.

By reducing employee data considered in the filtering process at 212 and 214 embodiments provide cost efficiency advantages over conventional HR tax credit certification processes; and further increase the aggregate value of tax credits obtained by prioritizing the tax credit application resources on the highest ranked value or likelihood opportunities as determined at 216 and 218.

While conventional HR tax credit screening and certification processes are generally costlier in proportion to the number of their employees, aspects of the present invention leverage the larger numbers of employees and associated data quantities of bigger employers into advantages in training and thereby improving the performance and accuracy of the Neural Network Classifier utilized at 210. Thus, the more data used to train the Neural Network Classifier, the more likely that delays inherent in conventional HR screening processes are reduced or eliminated, increasing the likelihood that tax credit eligibility will be recognized for a given employee before the lapse of applicable deadlines. Embodiments therefore enable organizations to dynamically grow and increase hiring by proportionately improving efficiencies and lowering costs associated with acquiring tax credits, including by proportionately reducing missed tax credit opportunities.

Embodiments dynamically train the Neural Network Classifier deployed at 210 on current eligibility requirements for a wide universe of available employee tax credit opportunities: illustrative but not limiting or exhaustive examples include credits available to employees due to status as a military veteran, including during initial entry into the work-force or training or educational programs after separation from military service; to employees participating in state or federal unemployment benefits and job training; to disabled employees (including in combination with veteran status); for receiving food stamps, housing, or heating assistance due to meeting income limits; to rehabilitated felons; for complying with "welfare-to-work" requirements; for meeting "long-term unemployed" (LTUE) program requirements, and still other tax credit opportunities will be apparent to one skilled in the art.

Aspects of the present invention include systems, methods and computer program products that implement the examples described above. A computer program product may include a computer-readable hardware storage device medium (or media) having computer-readable program instructions thereon for causing a processor to carry out aspects of the present invention.

Figure 2:
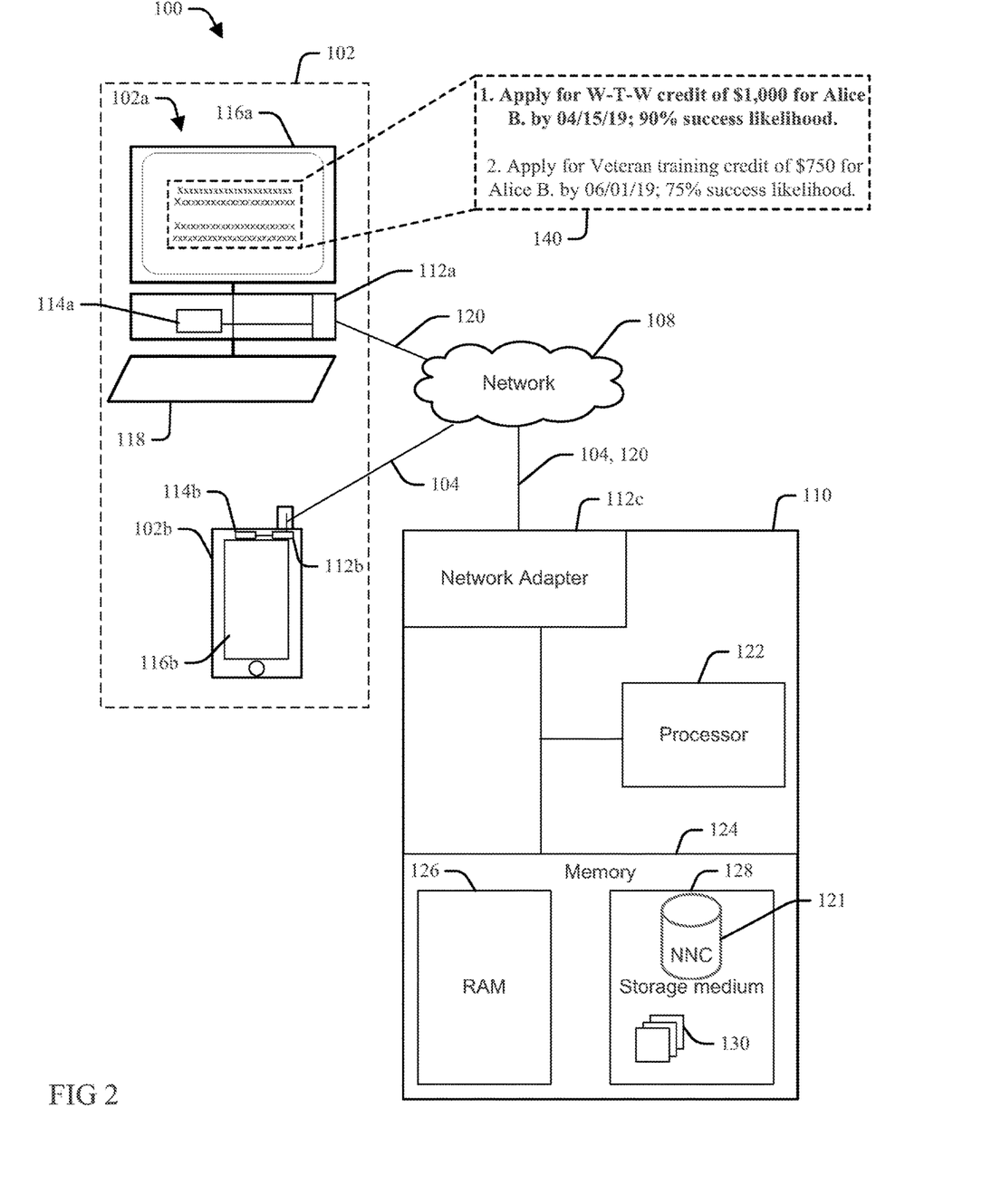
FIG. 2 is a graphic illustration of an example of an implementation according to the present invention.

FIG. 2 is a schematic, graphic illustration of an embodiment of a system 100 for identifying and prioritizing employee tax credit opportunities pursuant to the process or system of FIG. 1. The system 100 includes one or more local computing devices 102, such as, for example, a desktop computer 102a, smartphone 102b, or a laptop computer, a personal digital assistant, tablet, cellular telephone, body worn device, and the like. Lines of the schematic illustrate communication paths between the devices 102a, 102b and a computer server 110 over a network 108, and between respective components within each device. Communication paths between the local computing devices 102a and 102b and the computer server 110 over the network 108 include respective network interface devices 112a, 112b, and 112c within each device, such as a network adapter, network interface card, wireless network adapter, and the like.

In the present example the smartphone 102b transfers (provides) an employee payroll data input 104 (such as input by a user via a GUI display screen 116b) over a network 108 to a computer server 110 via their respective network interface adapters 112b and 112c.

The computer server 110 includes a processor 122 configured (thus, the "configured processor" discussed above with respect to FIG. 1) with instructions stored in a memory 124. The processor 122 of the computer server 110 and the processors 114a and 114b of the local computing devices include, for example, a digital processor, an electrical processor, an optical processor, a microprocessor, a single core processor, a multi-core processor, distributed processors, parallel processors, clustered processors, combinations thereof and the like. The memory 124 includes a computer readable memory 126 and a computer readable storage medium 128.

The computer server 110, in response to receiving the payroll data 104, generates prioritized, multi-class output data 120 for each employee that indicates strength of likelihood or probability that each employee is currently eligible for each of a plurality of different tax credits as a function of their respective normalized (anonymized) extracted, labeled and/or augmented employee data via the trained Neural Network Classifier (NNC) 121, as described above with respect to FIG. 1.

The computer server 110 returns the prioritized, multi-class output data 120 over the network 108 to the desktop computer 102a via their respective network interface adapters 112c and 112a. The desktop computer 102a includes one or more input devices 118, such as a keyboard, mouse, microphone, touch screen, etc., and a processor 114a which drives a display device 116a to generate and display a presentation 140 of at least a portion of the prioritized, multi-class output data 120.

In the present example, the presentation 140 of the prioritized, multi-class output data 120 includes two potential tax credits identified by the Neural Network Classifier (NNC) 121 for an employee that is identified with the anonymized (partially redacted) name of "Alice B." The highest-ranked one is prioritized relative to the other via display with a higher numbered designation ("1.") and a bold-face font display, relative to the other, lower ranked ("2.") possible tax credit. The prioritization may be based on one or more of differences in value ($1,000 versus $750), application deadline dates (wherein Apr. 15, 2019 expires or lapses prior to Jun. 1, 2019 with respect to a current date of the presentation generation 140), or likelihood of success in receiving the identified tax credit (90% success likelihood for the W-T-W, relative to 75% success likelihood for the Veteran training credit). Users may define prioritization upon weighted or un-weighted considerations or combinations of these or other values: for example, the deadline date may be given a highest weight, within the value of the credit given a next highest weight.

The computer readable storage medium 128 can be a tangible device that retains and stores instructions for use by an instruction execution device, such as the processor 122. The computer readable storage medium 128 may be, for example, but is not limited to, an electronic storage device, a magnetic storage device, an optical storage device, an electromagnetic storage device, a semiconductor storage device, or any suitable combination of the foregoing. A computer readable storage medium 128, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be transmitted to respective computing/processing devices from the computer readable storage medium 128 or to an external computer or external storage device via the network 108. The network 108 can include private networks, public networks, wired networks, wireless networks, data networks, cellular networks, local area networks, wide area networks, the Internet, and combinations thereof. The network interface devices 112a, 112b and 112c receive and send computer readable program instructions from or to the network 108, and may thereby forward computer readable program instructions for storage in a computer readable storage medium 128.

Computer readable program instructions for carrying out operations of the present invention may include assembler instructions, instruction-set-architecture (ISA) instructions, machine instructions, machine dependent instructions, microcode, firmware instructions, state-setting data, configuration data for integrated circuitry, compiled or interpreted instructions, source code or object code written in any combination of one or more programming languages or programming environments, such as Java® (Java is a registered trademark of Oracle America, Inc.), Javascript, C, C#, C++, Python, Cython, F#, PHP, HTML, Ruby, and the like.

The computer readable program instructions may execute entirely on the computer server 110, partly on the computer server 110, as a stand-alone software package, partly on the computer server 110 and partly on the local computing device 102 or entirely on the local computing device 102. For example, the local computing device 102 can include a web browser that executes HTML instructions transmitted from the computer server 110, and the computer server executes Java® instructions that construct the HTML instructions. In another example, the local computing device 102b includes a smartphone application, which includes computer readable program instructions to perform imaging and transfer of the payroll data 104, and the computer server 110 includes different computer readable program instructions to receive and process the transferred payroll data 104.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine ("a configured processor"), such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The memory 124 can include a variety of computer system readable media. Such media may be any available media that is accessible by computer server 110, and the media includes volatile media, non-volatile media, removable, non-removable media, and combinations thereof. Examples of the volatile media can include random access memory (RAM) and/or cache memory. Examples of non-volatile memory include magnetic disk storage, optical storage, solid state storage, and the like. As will be further depicted and described below, the memory 124 can include at least one program product having a set (e.g., at least one) of program modules 130 that are configured to carry out the functions of embodiments of the invention.

The computer system 100 is operational with numerous other computing system environments or configurations for tracking motions and other activities of a worker performing work-piece based compensation work according to the present invention. Examples of well-known computing systems, environments, and/or configurations that may be suitable for use with computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one aspect, a service provider may perform process steps of the invention on a subscription, advertising, and/or fee basis. That is, a service provider could offer to integrate computer-readable program code into the computer system 100 to enable the computer system 100 to generate a prioritized, multi-class output for each employee that indicates strength of likelihood or probability that each employee is currently eligible for each of a plurality of different tax credits as a function of their respective normalized (anonymized) extracted, labeled and/or augmented employee data values, as discussed in the Figures. The service provider can create, maintain, and support, etc., a computer infrastructure, such as components of the computer system 100, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 110, from a tangible computer-readable medium device 128; (2) adding one or more computing devices to the computer infrastructure 100; and (3) incorporating and/or modifying one or more existing systems 110 of the computer infrastructure 100 to enable the computer infrastructure 100 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply any precedence, ordering or ranking of any claim elements, limitations or process steps.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   one or more processors;
   a computer readable memory in circuit communication with the one or more processors; and
   a computer readable storage medium in circuit communication with the one or more processors; and wherein the one or more processors executes program instructions stored on the computer readable storage medium via the computer readable memory to:
   generate, via a model trained with machine learning on data on historical applications for tax credits, using data on eligibility of applicants for tax credits input into the model, a plurality of likelihoods that the applicants are eligible for the tax credits;
   filter the data on eligibility to remove a subset of the data on eligibility having likelihoods of eligibility for the tax credits that are less than or equal to a threshold;
   provide a remainder set of data on eligibility that includes the likelihoods of eligibility of a remainder of the applicants for the tax credits that exceed the threshold;
   prioritize an order of applications for the tax credits for the remainder of the applicants based at least on respective likelihoods of eligibility for the tax credits indicated within the remainder set of data; and
   transmit one or more data packets over a computer network to cause a server to execute one or more operations for a tax credit of an applicant of the remainder of the applicants in accordance with the prioritized order.

2. The system of claim 1, wherein the one or more processors further:
   extract, from payroll data on a plurality of applicants, historical data that is associated with previous instances of tax credit eligibility for the plurality of applicants; and
   generate, based on the historical data that is normalized with respect to data type and data value of the historical data, the data on eligibility of applicants for tax credit, wherein the threshold corresponds to a value of no likelihood of eligibility.

3. The system of claim 1, wherein the one or more processors further:
   extract, from a data corresponding to the plurality of applicants, the data on eligibility;
   join the extracted data with historical screening information for labeling data;
   label the joined extracted data with a data type; and
   generate structured data in the labelled data type via machine learning from an input of the labelled joined extracted data.

4. The system of claim 1, wherein the data on eligibility includes at least one of applicant name, date of hire, domicile address, business unit address, current and prior employment job titles, job duties, industry types, wage and salary information, military service history, awarded disability status, gender, age or unique taxpayer identification number.

5. The system of claim 1, wherein the one or more processors further:
   identify additional data on eligibility of applicants associated with the eligibility for the tax credits via analysis of the data comprising at least one of social or professional networking media, newsfeeds, governmental records, credit report agency records or insurance company records; and
   augment the data on eligibility with the additional data on eligibility of applicants.

6. The system of claim 1, wherein the one or more processors further:
   augment the data on eligibility with additional data on eligibility of applicants by identifying a uniform worn by a first applicant of the plurality of applicants within an image of the first applicant; and
   provide the remainder set of data including a likelihood that the first applicant is eligible for a veteran tax credit at least based on a nationality of the first applicant and the uniform.

7. The system of claim 2, wherein the one or more processors further:
   augment the extracted historical data with additional data on eligibility of applicants by identifying, via one of an analysis of an image or a natural language processing, at least one of an age or a disability status of a first applicant, the age or the disability status determined according to at least one of an image or a written statement; and generate the plurality of likelihoods that includes a likelihood of eligibility of at least one of an age credit associated with the first applicant according to the identified age or a disability credit associated with the first applicant according to the identified disability status.

8. The system of claim 1, wherein the one or more processors further train a neural network classifier of the model using a result of a tax credit application executed for the tax credits for the applicant.

9. The system of claim 1, wherein the one or more processors further:
train the model comprising a neural network classifier using at least one of a backpropagation, a genetic algorithm, a Lagrange multiplier update and a Bayesian optimization, wherein the neural network classifier uses at least one of Keras/Tensorflow, PyTorch, Sklearn, Chainer and Apache MXNet neural network frameworks.

10. The system of claim 1, wherein the one or more processors further:
extract from data corresponding to the plurality of applicants, the data on eligibility;
normalize the extracted data with respect to data values of the extracted data; and
generate, using the normalized extracted data input into the model, the plurality of likelihoods.

11. The system of claim 1, wherein the one or more processors is provided as a portion of a service in a cloud environment.

12. A method executed by one or more processors that is in a circuit communication with a computer readable memory and a computer readable storage medium storing program instructions executed by the one or more processors, the method comprising:
generating, by the one or more processors executing the computer instructions, via a model trained with machine learning on data on historical applications for tax credits and using data on eligibility of applicants for tax credits input into the model, a plurality of likelihoods that the applicants are eligible for the tax credits;
filtering, by the one or more processors, the data on eligibility to remove a subset of the data on eligibility having likelihoods of eligibility for the tax credits that are less than or equal to a threshold;
providing, by the one or more processors, a remainder set of data on eligibility that includes the likelihoods of eligibility of a remainder of the applicants for the tax credits that exceed the threshold;
prioritizing, by the one or more processors, an order of applications for the tax credits for the remainder of the applicants based at least on respective likelihoods of eligibility for the tax credits indicated within the remainder set of data; and
transmitting, by the one or more processors, for a tax credit of an applicant of the remainder of the applicants in accordance with the prioritized order.

13. The method of claim 12, comprising:
extracting, by the one or more processors, from payroll data on a plurality of applicants, historical data that is associated with previous instances of tax credit eligibility for the plurality of applicants; and
generating, by the one or more processors, based on the historical data that is normalized with respect to data type and data value of the historical data, the data on eligibility of applicants for tax credit, wherein the threshold corresponds to a value of no likelihood of eligibility.

14. The method of claim 12, comprising:
extracting, by the one or more processors, from a data corresponding to the plurality of applicants, the data on eligibility;
joining, by the one or more processors, the extracted data with historical screening information for labeling data;
labeling, by the one or more processors, the joined extracted data with a data type; and
generating, by the one or more processors, structured data in the labelled data type via machine learning from an input of the labelled joined extracted data.

15. The method of claim 12, wherein the data on eligibility of applicants includes at least one of applicant name, date of hire, domicile address, business unit address, current and prior employment job titles, job duties, industry types, wage and salary information, military service history, awarded disability status, gender, age, or unique taxpayer identification number.

16. The method of claim 12, comprising:
identifying, by the one or more processors, additional data on eligibility of applicants associated with the eligibility for the tax credits via analysis of the data comprising at least one of social or professional networking media, newsfeeds, governmental records, credit report agency records and insurance company records; and
augmenting, by the one or more processors, the data on eligibility of applicants with the additional data of the applicants.

17. The method of claim 16, wherein the augmenting comprises identifying a uniform worn by a first applicant of the plurality of applicants within an image of the first applicant; and
wherein the plurality of likelihoods includes a likelihood that the first applicant is eligible for a veteran tax credit associated with the first applicant at least based on a nationality of the first applicant and the uniform.

18. The method of claim 12, comprising:
identifying, by the one or more processors, additional data of the applicants associated with the eligibility for the tax credits via at least one of an analysis of an image or a natural language processing, the additional data comprising at least one of an age or a disability status of an applicant, the age or the disability status determined according to an image or a written statement, wherein the plurality of likelihoods includes a likelihood of eligibility of at least one of an age credit associated with a first applicant or a disability credit associated with the first applicant.

19. A non-transitory computer readable medium storing instructions for execution by one or more processors in circuit communication with the non-transitory computer readable medium to cause the one or more processors to:
generate, via a model trained with machine learning on data on historical applications for tax credits, using data on eligibility of applicants for tax credits input into the model, a plurality of likelihoods that the applicants are eligible for the tax credits;
filter the data on eligibility to remove a subset of the data on eligibility having likelihoods of eligibility for the tax credits that are less than or equal to a threshold;
provide a remainder set of data on eligibility that includes the likelihoods of eligibility of a remainder of the applicants for the tax credits that exceed the threshold;

prioritize an order of applications for the tax credits for the remainder of the applicants based at least on respective likelihoods of eligibility for the tax credits indicated within the remainder set of data; and transmit one or more data packets over a computer network to cause a server to execute one or more operations for a tax credit of an applicant of the remainder of the applicants in accordance with the prioritized order.

20. The non-transitory computer readable medium of claim 19, wherein the instructions are configured to:

extract, from payroll data on a plurality of applicants, historical data that is associated with previous instances of tax credit eligibility for the plurality of applicants; and generate, based on the historical data that is normalized with respect to data type and data value of the historical data, the data on eligibility of applicants for tax credit, wherein the threshold corresponds to a value of no likelihood of eligibility.

* * * * *